United States Patent [19]

Armington et al.

[11] Patent Number: 5,570,184
[45] Date of Patent: Oct. 29, 1996

[54] METHOD AND APPARATUS FOR LOCATING THE POSITION OF LASING GAPS FOR PRECISE ALIGNMENT AND PLACEMENT OF OPTOELECTRIC COMPONENTS

[75] Inventors: Richard S. Armington, Hopewell; Leroy D. L'Esperance, Erial, both of N.J.

[73] Assignee: Lucent Technologies Inc., Murray Hill, N.J.

[21] Appl. No.: 350,917

[22] Filed: Dec. 7, 1994

[51] Int. Cl.$^6$ .............................. G01B 11/14; H01S 3/02
[52] U.S. Cl. .......................... 356/375; 356/399; 228/105; 348/95
[58] Field of Search ..................... 356/375, 376, 356/394, 400, 237, 399; 348/87, 126, 94, 95; 29/721, 759; 250/559.29, 559.3, 559.34; 228/180.21, 180.22, 6.2, 105

[56] References Cited

U.S. PATENT DOCUMENTS

| | | | |
|---|---|---|---|
| 4,803,871 | 2/1989 | Harada et al. | 356/376 |
| 4,832,251 | 5/1989 | Hawrylo | 356/399 |
| 4,899,921 | 2/1990 | Bendat et al. | 228/105 |

*Primary Examiner*—Hoa Q. Pham

[57] ABSTRACT

An apparatus and method are provided to energize an optoelectric component, such as a semiconductor laser chip, exciting a lasing gap to emit light from the front facet of the chip. The laser is positioned on a transparent tool element having a conductive portion thereon. The conductive portion is preferably a metallized ITO surface transparent to visible light. This allows the laser to be energized while simultaneously looking through the tool element to image a feature on the laser. The lasing gap is then located with a high degree of precision with respect to this feature. This precise location information is used to position and bond the laser chip with respect to an optical transmission line with precise alignment.

12 Claims, 3 Drawing Sheets

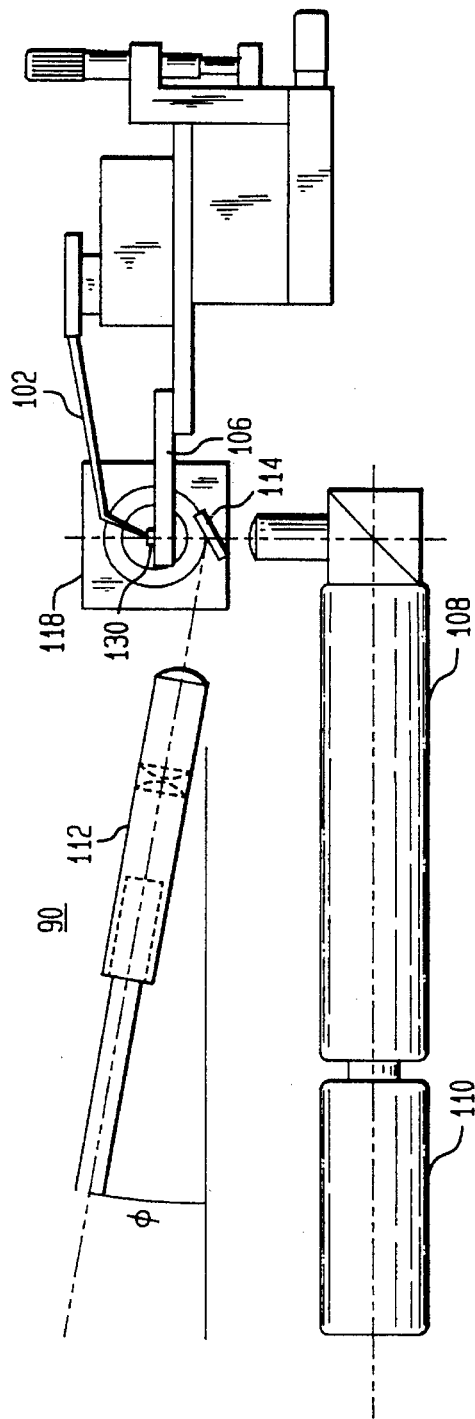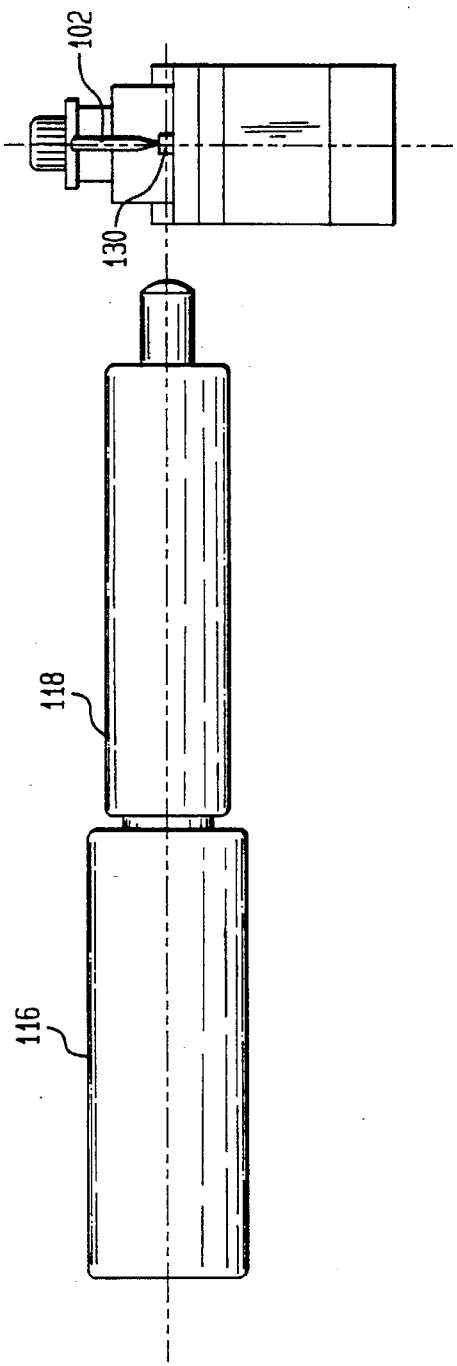

METHOD AND APPARATUS FOR LOCATING THE POSITION OF LASING GAPS FOR PRECISE ALIGNMENT AND PLACEMENT OF OPTOELECTRIC COMPONENTS

BACKGROUND OF THE INVENTION

1. Field of the Invention

This invention relates generally to optical and electronic bonding equipment and more particularly, to apparatus and methods for precisely locating the position of a lasing gap of a laser chip and correlating it with a feature on the chip.

2. Description of the Related Art

Precise alignment of surfaces in the placement of optoelectric components has received much attention. This is particularly true in VLSI circuit elements where the patterning of the circuit is microscopic or nearly microscopic. Many small components are typically bonded to these circuits. The problem with placing these small components with high precision i.e. within microns, is accurately locating and correlating the component and placement position. Also, the component must be moved to the exact placement position without error.

In a typical lightwave application, the output of a semiconductor laser chip is coupled to an optical transmission line such as an optical fiber or waveguide. Often a ball lens is used to optimize coupling between the laser and the fiber. If low coupling efficiencies are acceptable, current precision assembly equipment and conventional alignment techniques can be used. See, for example, U.S. Pat. No. 4,899,921 to Bendat et al. If, however, highly precise alignment is required for greatest coupling efficiency, then current practice dictates that active alignment be used. This is performed by fixturing one element, e.g. the laser/ball lens assembly, energizing the laser, and moving the fiber around until the greatest output is realized. This is an imprecise and time consuming process that limits the range of automated solutions because of its complexity. Accordingly, a need exists for a method and apparatus which can achieve a highly precise alignment in a manner that is less time consuming and is conducive to large scale automation.

SUMMARY OF THE INVENTION

In accordance with the principles of the invention, a tool element having a substantially transparent portion is provided for holding an optoelectric component. Preferably, the tool element is formed of an optical glass which is substantially light transparent. Where the optoelectric component is a semiconductor laser chip to be coupled with an optical transmission line, the tool element is provided with an electrically conductive portion configured to permit energizing of the laser while being held by the tool element. Preferably, the electrically conductive portion is a metallized pad formed from a layer of a conducting element, such as Indium Tin Oxide (ITO), which has the desirable properties of being transparent to the visible light spectrum as well as being electrically conductive. This eliminates the need for a second probe on the laser chip as the ITO comprises the second contact for energizing the chip. The laser is energized via the ITO portion to emit infrared light and is simultaneously viewed with an infrared camera to locate the lasing gap and a visible light camera to locate an existing feature so that the lasing gap can be correlated to the existing feature. Preferably this feature is a metallized pad used to energize the chip, or some similar feature that is close to this pad.

The infrared camera provides a high magnification image of the lasing facet of the chip allowing location of the lasing gap to better than 1 micron. The visible light camera preferably looks up through the ITO layer and transparent tool element portion to identify the reference feature. A light source and beam splitter are provided to give uniform broad illumination for the visible light camera. Once the two camera fields have been calibrated and correlated to each other using a suitable calibration scheme, the lasing gap position can be correlated to the reference feature on the chip and this information used for high precision passive alignment.

BRIEF DESCRIPTION OF THE DRAWINGS

Preferred embodiments of the apparatus and method are described in detail hereinbelow with reference to the drawings wherein:

FIG. 2 is a side view of the laser firing station for calibrating the lasing gap with respect to a feature on the laser chip;

FIG. 3 is a front view of the laser firing station showing the relative position of the infrared camera and system.

DETAILED DESCRIPTION OF THE PREFERRED EMBODIMENTS

Figure 1:
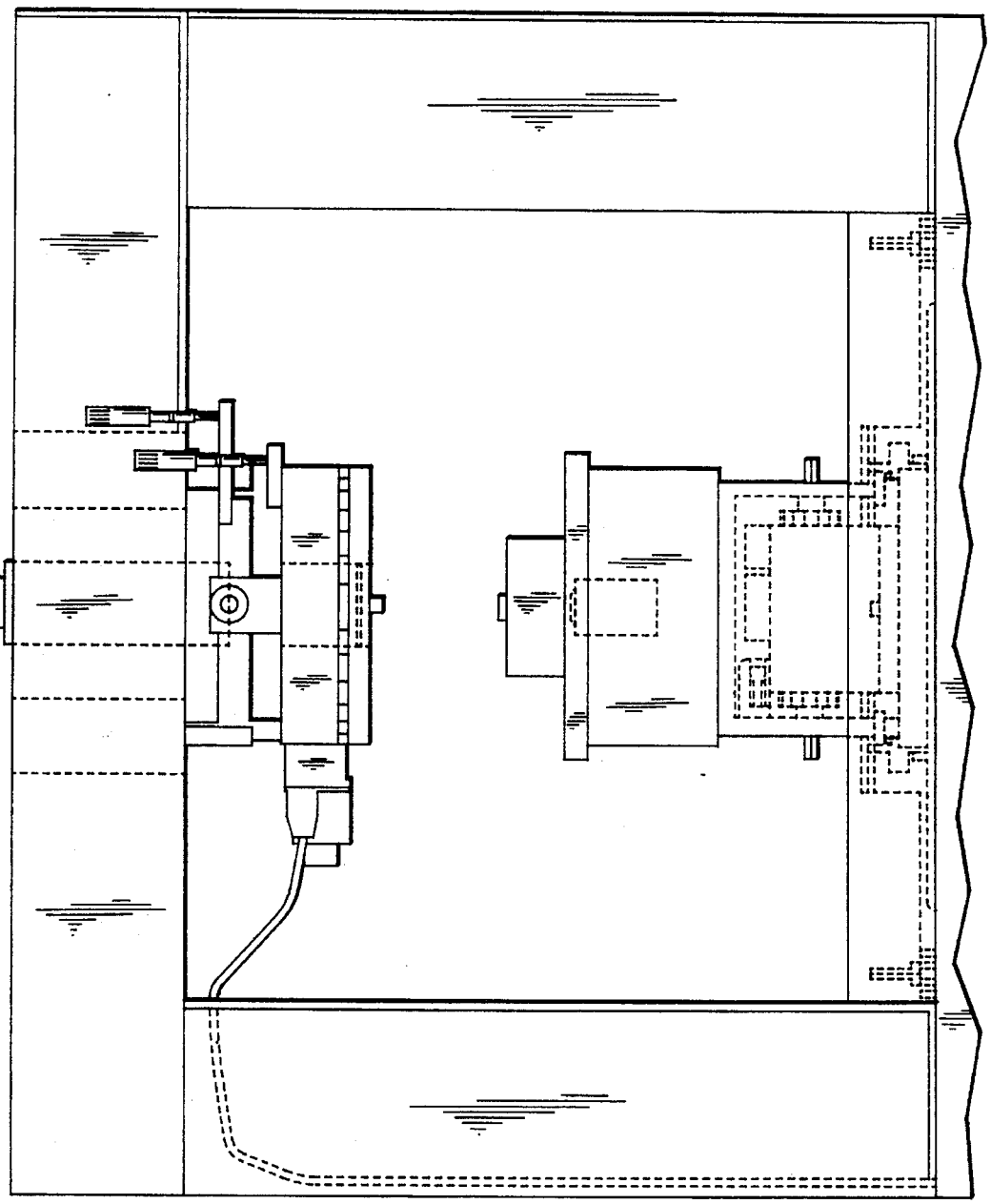
FIG. 1 is a plane view of the location and placement apparatus.

FIG. 1 illustrates, in a simplified manner, a preferred configuration of the location and placement apparatus in accordance with the present invention for use in a passive alignment system. When used for aligning and placing optoelectric components such as, for example, semiconductor laser chips, it is important know the location of the lasing gap. This can be accomplished by energizing the laser and, with an appropriate viewing apparatus such as an infrared camera, locating the lasing gap while viewing another portion of the laser chip with another viewing apparatus so that the lasing gap can be correlated to a reference feature on the laser chip. FIG. 2 illustrates a laser firing station 90 in accordance with a preferred embodiment of the present invention. A semiconductor laser chip 130 is positioned at a laser firing station 90. The laser chip 130 is held on a novel transparent tool element 106. At least a portion of tool element 106 is transparent to light.

Figure 2A:
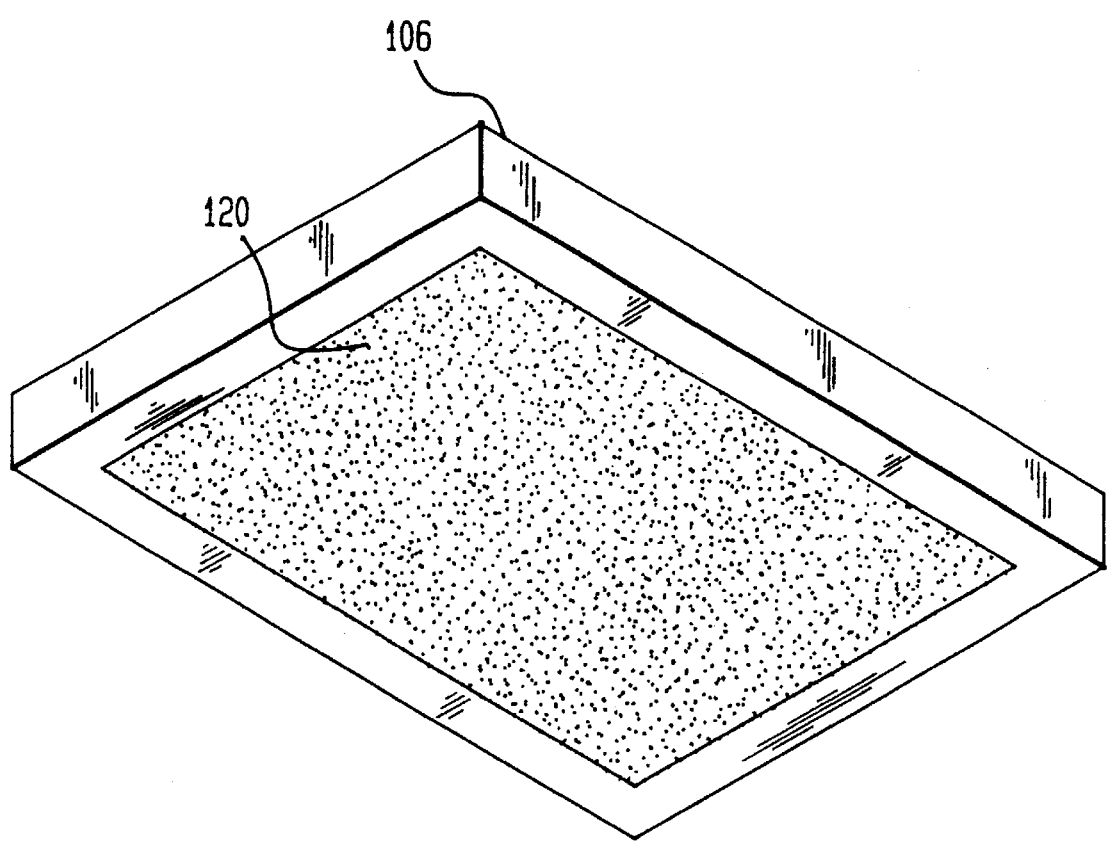
FIG. 2A is an upward looking view of the transparent tool.

In this embodiment, tool element 106 is a flat glass plate. A conductive portion is provided on the tool element 106 to facilitate energizing of the semiconductor laser chip 130. This conductive portion is preferably formed of a layer of Indium Tin Oxide (ITO) 120 as shown in FIG. 2A. ITO 120 is a particularly preferred material because, in addition to being electrically conductive, it is transparent to visible light. The use of the ITO 120 as the second electric contact dispenses with the need for a second probe on the laser chip 130 which would occlude the visible image of the chip 130. As shown herein, the top portion of the tool element 106 is metallized with a layer of ITO 120. A visible camera 110 looks through the ITO 120 layered tool element 106 to the laser chip 130 in order to identify some feature on the laser chip 130. This is preferred because the edges of the laser chip 130 are very sensitive to the lighting changes and are prone to chipping. The laser child 130 is energized using the ITO 120 surface metallization with a probe 102 which provides a second contact for firing the laser chip 130.

Referring to FIG. 3, infrared camera 116, with its infrared optical system 118, provides a high magnification image of the lasing facet of the chip 130, taking an image of the laser spot being illuminated on the laser chip 130. This high magnification image allows location of the gap to better than 1 micron. The visible light camera 110, using the optic system 108, takes an upward looking image of the laser chip 130 through the ITO metallized base to determine a reference feature on the laser chip 130 as a reference point.

An illumination system, including a visible light source 112 and a beam splitter 114, provides a uniform broad illumination for camera 110. This minimizes spectral reflections from the laser chip 130. If the angle of illumination is normal to the ITO metallized surface of the tool element 106, the ITO surface metallization 120 will reflect much more light than the uncoated glass. Where the desired objective is to align the laser 130 chip to the ITO pattern on the tool element 106, this orientation is advantageous. However, where it is necessary to reduce the amount of reflected light to improve the contrast of the captured image, the illumination system is positioned at an angle Ø with respect to the ITO surface metallization 120. In this manner, the angle of reflection is outside the field of view of the visible light camera 110. Preferably angle Ø is set at about 10° from normal of the ITO surface metallization. The patterns in the white light image are transformed into a series of equations and the infrared image of the spot is correlated and calibrated into the equations using the feature on the laser chip 130 as a reference point.

Once the two camera fields are calibrated and correlated to each other, the laser chip 130 can be moved to a bonding apparatus 10 of a passive alignment system (FIG. 1). It is possible to reference the lasing gap position to the visible light feature on the laser chip 130 as saved information. This information is used to position the laser chip 130 with respect to other elements such as, for example, a coupling ball lens or optical fiber by re-acquiring the visible light image at the bonding station and then using that information to reference the gap location for high precision alignment without requiring the use of active alignment techniques.

Although the subject invention has been described with respect to preferred embodiments, it will be readily apparent to those having ordinary skill in the art to which it appertains that changes and modifications may be made thereto without departing from the spirit or scope of the subject invention as defined by the appended claims.

What is claimed is:

1. An apparatus for locating a lasing gap position of an optoelectric component comprising:

tool means for holding and energizing said optoelectric component, including a substantially light transparent portion and an electrically conductive portion, wherein said electrically conductive portion is configured to selectively energize said optoelectrical component to emit light; and an image gathering optics system including at least one camera positioned relative to said tool means for receiving positional information regarding said optoelectrical component through said light transparent portion.

2. The apparatus of claim 1, wherein electrically conductive portion comprises an Indium Tin Oxide strip.

3. The apparatus of claim 1, wherein said at least one camera is positioned directly below said light transparent portion.

4. The apparatus of claim 1 further comprises an optical system for relaying positional information of a lasing gap on said optoelectrical component to said at least one camera when said optoelectrical component is energized to emit said light.

5. The apparatus of claim 4, wherein said light is infrared laser light.

6. The apparatus of claim 5, wherein said infrared light is superimposed on a visible light image of said optoelectrical component and reflected to said image gathering optics system.

7. The apparatus of claim 6, wherein said image from said at least one camera entails a feature from said optoelectrical component.

8. A method for locating a lasing gap position of an optoelectrical component, comprising the steps of:

holding said optoelectrical component to a tool means including a substantially light transparent portion and an electrically conductive portion;

energizing said optoelectrical component producing said lasing gap;

imaging said optoelectrical component relative to said lasing gap; and obtaining positional information regarding said optoelectrical component relative to said lasing gap.

9. The method of claim 8 wherein said imaging is with an infrared imaging optics system.

10. The method of claim 9 further comprising second imaging said optoelectrical component relative to a feature on said optoelectrical component.

11. The method of claim 10 wherein said second imaging is with a visible light imaging optics system.

12. The method of claim 10 wherein said positional information is with respect to said feature on said optoelectrical component.

\* \* \* \* \*